United States Patent Office 3,767,674
Patented Oct. 23, 1973

3,767,674
CYCLOHEXENO-THIOXANTHONES
Ibrahim Mohamed Nabih, Zamalek, Cairo, Egypt, assignor to Ostra Lakemedel Aktiebolag, Sodertalje, Sweden
No Drawing. Filed Oct. 1, 1971, Ser. No. 185,862
Int. Cl. A61k 27/00; C07d 65/18
U.S. Cl. 260—328    3 Claims

ABSTRACT OF THE DISCLOSURE

Compounds, useful as schistosomicidal and carcinostatic agents of the thiaxanthone type having the general formula

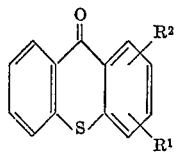

(I)

and a pharmaceutically acceptable salt thereof, wherein $R^1$ is the group

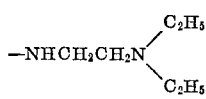

and $R^2$ is a cyclohexyl residue fused to the thiaxanthone molecule. Also pharmaceutical preparations containing one or more of these compounds and the use of these compounds as carcinostatic agents and in the treatment of schistosomiasis.

---

The present invention relates to new and valuable schistosomicidal and carcinostatic compounds and their preparation.

More particular the invention relates to compounds of the general formula

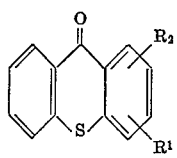

(I)

and pharmaceutically acceptable salt thereof, wherein $R^1$ is the group

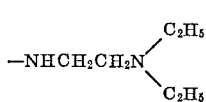

and $R^2$ is a cyclohexyl residue fused to the thiaxanthone molecule in the 1,2 or 3,4 position and to methods for the preparation of compounds of the Formula I. The invention also relates to pharmaceutical preparations containing one or more compounds of the Formula I as active ingredient in combination with a pharmaceutically acceptable carrier, and the use of compounds of the Formula I in the treatment of schistosomiasis. The invention also relates to the medicinal use particularly of the compound II as defined below as a carcinostatic agent.

The non-toxic salts of the compounds of the present invention include salts of mineral acids such as hydrochloric acid.

The specially preferred compounds of the invention are

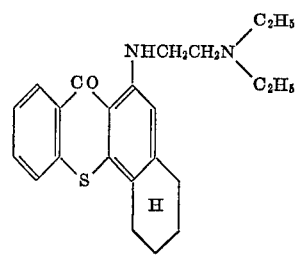

(II)

and

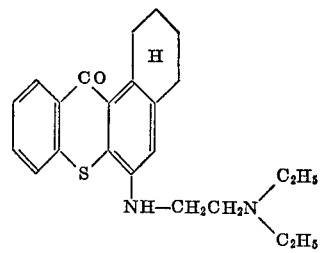

(III)

and pharmaceutically acceptable salts thereof. Another compound of the Formula I is

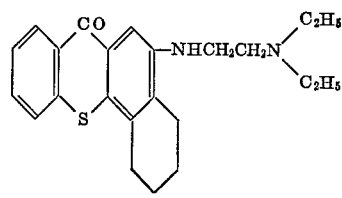

(X)

The compounds of the present invention may be prepared by reacting a compound of the formula

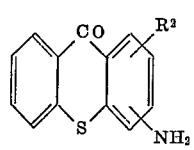

(IV)

wherein $R^2$ has the meaning specified above, with a compound of the formula

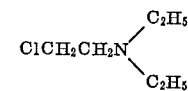

(V)

to the formation of a compound of the Formula I, whereafter, if desired, the compound I is converted into a pharmaceutically acceptable salt by reaction with an appropriate acid.

Intermediates of the Formula IV may be prepared according to the following reaction schemes:

(a)

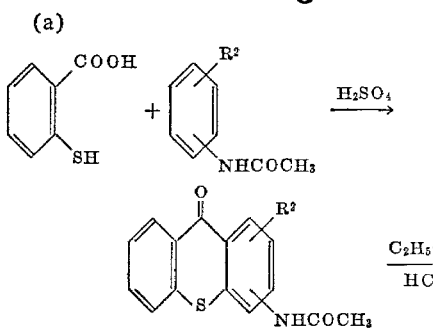

or (b)

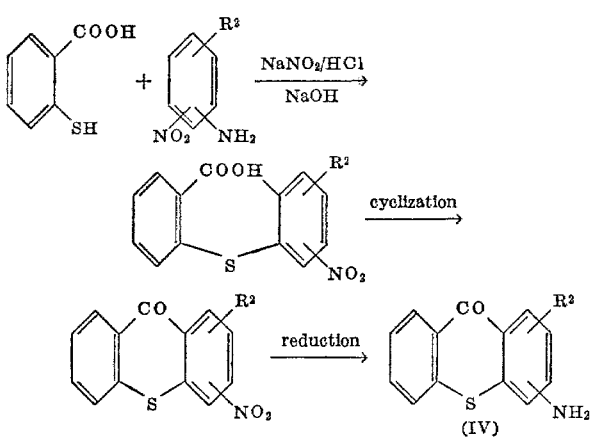

wherein R² has the above given definition.

Schistosomiasis is a widely spread human parasitic disease that infects about 200 million persons of the world population, thus causing tremendous loss in economy and man's power in the area where it invades.

The disease tends to spread i.a. due to improvements in the irrigation systems, as this adds more area of suitable habitat to hte intermediate host of the parasite, a kind of snails. The overall clinical picture of the disease is terrible due to the symptoms of anemia, under development, and debility it causes. Besides there is a higher incidence of cancer of bladder in the countries where the disease prevails.

To bring the disease under control, proper measurements for attack should be encountered.

These naturally should include the eradication of snails, the intermediate vector of the parasite.

Also, treatment of infected patients with drugs that would attack the adult schistosomes within the patient is absolutely necessary.

In the past only two classes of substances have been used as drugs of choice with varying success for this purpose. One of these classes is trivalent antimony compounds that are given through injection, due to the lack of absorption of antimony through the gastric tract, if given orally. Antimonials inhibit the rate of glycolysis in the parasite, as they interfere with a single step in glycolysis, the phosphorylation of fructose-6-phosphate by adenosine triphosphate to result in fructose 1,6-diphosphate and adenosine diphosphate.

Besides, the high toxicity of the antimony compounds which may cause fatalities, and the chemical instability during storage, the way of their application itself by injection is impractical especially when considering the vast areas where the infection is widely distributed.

The other class of compounds used for treatment is certain thiaxanthone derivatives. These were the first non-metallic organic compounds found to be biologically active by the oral route. The most interesting representatives of this group are 1-(β-diethylaminoethylamino)-4-methyl thiaxanthone, known commercially as "Lucanthone" or "Miracil D" (V), and 1-(β-diethylaminoethylamino)-4-methyl-6-chloroxanthone (VI) or "Miracil C."

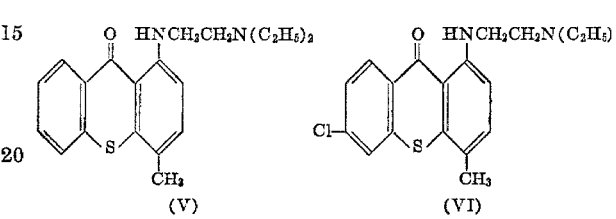

However, the most promising agent, Lucanthone, presents at the therapeutic dosage level undesirable side effects such as insomnia, anorexia and vomiting.

According to the patent invention it has surprisingly been found that the compounds of the Formula I are more active as schistosomicidal agents than are the previously known compounds.

Furthermore it has been found that the compounds of the invention have carcinostatic qualities.

The following examples will further illustrate the invention.

EXAMPLE 1

Preparation of starting material for preparing compound III (a) 4-acetamino-1,2-cyclohexenothiaxanthone: A mixture of thiosalicylic acid (4 gm., 1.54 moles) and 75 ml. concentrated sulphuric acid was shaken, then 5 gm. (1.89 moles) of 6-acetamino Tetralin were added in small portions.

Shaking continued at room temperature for 20 hr., and then further stirred at 50° for two hours, cooled and poured over ice-water. The formed precipitate was filtered off, washed with water, ammonia solution and water to give after dryness 6.7 gm. (2% yield) of 4-acetamino-1,2-cyclohexenothiaxanthone, M.P. 217–219°. After recrystallization from benzene, it melted at 230–231°.

*Analysis.*—Calcd. for $C_{19}H_{17}NO_2S$ (percent): C, 70.56; H, 5.3; S, 9.89. Found (percent): C, 70.00; H, 5.49; S, 9.9.

(b) 4-amino - 1,2 - cyclohexenothiaxanthone: To 100 ml. ethanol and 30 ml. concentrated hydrochloric acid were added 5 gm. of 4-acetamino-1,2-cyclohexenthiaxanthone then refluxed for 5 hr. The mixture was cooled, and the formed precipitate was filtered and boiled with NaOH (50%) solution for about 10 min. The yellow product was filtered and washed with water to give 4.2 gm. of 4-amino-1,2-cyclohexenthiaxanthone. It was recrystallized from ethanol in yellow prisms, M.P. 185–186°

*Analysis.*—Calcd. for $C_{17}H_{19}NOS$ (percent): C, 72.56; H, 5.37; N, 4.94; S, 11.39. Found (percent): C, 72.53; H, 5.66; N, 4.79; S, 11.41.

N.B.: The product was highly electrostatic.

EXAMPLE 2

Preparation of 4-(β-diethylaminoethylamino)-1,2-cyclohexenothiaxanthone

A mixture of 4-amino-1,2-cyclohexenothiaxanthone (1 gm.) and 0.45 ml. of β-chlorodiethyl aminoethyl was heated under reflux at 170° for 3 hr. The product was boiled with (50%) NaOH solution, cooled and the alkali layer was decanted. The residue was crystallized from 70% ethanol to give 1.2 gm. (90% yield of III M.P. 95–96°.

*Analysis.*—Calcd. for $C_{23}H_{28}N_2OS$ (percent): C, 72.59; H, 7.41; N, 7.36; S, 8.43. Found (percent): C, 72.44; H, 7.27; N, 7.34; S, 8.51.

The hydrochloride salt of the product obtained was prepared by dissolving it in dry ether, a dry HCl gas was allowed to pass in the solution. A yellow precipitate was formed, which was filtered, washed with dry ether and dried under reduced pressure for 24 hr. to give a hygroscopic hydrochloride of M.P. 150–155°. It was soluble in water.

EXAMPLE 3

Preparation of starting material for preparing Compound II (a) Reaction of 5-amino-7-nitro Tetralin with thiosalicylic acid:

$$H_2N \underset{NO_2}{\bigodot} \xrightarrow[\text{HOOC}]{\text{NaNO}_2/\text{HCl}} \underset{\text{HS}}{\bigodot} \text{OOOH} \quad \underset{S}{\overset{NO_2}{\bigodot}}$$

NaOH (VII)

A mixture of 5-amino-7-nitro Tetralin hydrochloride (10 gm.) and 20 ml. conc. HCl was stirred and cooled to 0°. A solution of $NaNO_2$ (sym) in 20 ml. water was added gradually. After 10 min. from the complete addition of $NaNO_2$ solution the diazonium solution was poured on a stirred mixture of thiosalicylic acid (6.5 gm.), NaOH (15 gm.) and 100 ml. water at 90°. The stirring and heating were continued for 2 hours, cooled and the mother liquor was gently decanted and the formed residue was boiled with water, filtered and the filtrate was acidified with acetic acid. The formed precipitate was filtered, washed with water and dried at suction to give VII.

Wt. 12 gm.
Rough M.P. 88–90°.
Crystallized from alcohol:benzene (3:1).

((b) Cyclization of the nitro-carboxylic acid (VII): Compound VII (4 gr.) was refluxed with 40 ml. dry benzene and then 3.5 g. of PCl were added portionwise. The mixture was refluxed for 1 hour, cooled and then 5 g. of anhydrous $AlCl_3$ were added gradually by shaking. The mixture was refluxed for 2 hours, benzene evaporated and the residue was poured over ice-water and few ml. of HCl. The p.pt. was filtered, washed with water and hot NaOH solution then water and washed with pet/ether then dried.

M.P. 188–192°.
Wt. 3.5 gm. of 1-nitro-3,4-cyclohexenothioxanthone (VIII).

1 - Amino - 3,4-cyclohexenothiaxanthone (IX): Compound VIII (7 g.) was refluxed with 30 ml. conc. HCl and 20 ml. ethanol. During stirring 8 gm. of iron powder were added in a small portion. The mixture was refluxed and stirred for 3 hours, cooled and filtered. The p.pt. was boiled with NaOH (50%) solution and filtered washed with water and dried. Crystallized from alcohol benzene. M.P. 235°.

EXAMPLE 4

Preparation of 1-($\beta$-diethylaminoethylamino)-3,4-cyclohexen-thiaxanthone (II)

The amino-thiaxanthone (IX) (2 gm.) was heated under reflux with 1 ml. $\beta$-chloro-diethylaminoethyl at 180° for 4 hours. The mixture was boiled with NaOH (50%) solution then cooled and filtered, the p.pt. was washed with water and dried. The precipitate was dissolved in dry ether and dry HCl gas was passed through the solution, a yellow precipitate was formed, filtered and washed with dry ether then dried in a vacuum desiccator for 24 hours a hygroscopic hydrochloride.

EXAMPLE 5

Preparation of starting material for preparing 2-($\beta$-diethylaminoethylamino)-3,4-cyclohexenothiaxanthone (a) 2-acetamino-3,4-cyclohexenothiaxanthone: A mixture of thiosalicylic acid (4.2 gm., 1.55 moles) 5-acetamino Tetralin (5 gm., 1.89 moles) and concentrated sulphuric acid (80 ml.) was shaken at room temperature for 30 hr., and stirred at 60° for 2 hr. The mixture was cooled then poured over ice-water, and the formed precipitate was filtered, washed with water, ammonia solution and water, after drying it weighed 6 gm. (70% yield) of 2-acetamino-3,4-cyclohexenothiaxanthone.

After recrystallization from benzene, it melted at 298–300°.

*Analysis.*—Calcd. for $C_{19}H_{17}O_2NS$ (percent): C, 70.56; H, 5.3; N, 4.32; S, 9.89. Found (percent): C, 70.57; H, 5.16; N, 4.05; S, 9.8.

(b) 2 - amino - 3,4 - cyclohexenothiaxanthone: A mixture of 2-acetamino-3,4-cyclohexenothiaxanthone (5 g.) absolute ethanol (125 ml.) and concentrated hydrochloric acid (30 ml.) was refluxed for 10 hr., then cooled and the formed hydrochloride was filtered and dried. It melted at 285–287°. This hydrochloride was boiled with (50%) NaOH solution for about 15 min., then filtered, washed with water and dried to give 4.2 gm. (96% yield) of 2-amino-3,4-cyclohexenothiaxanthone.

It was recrystallized for ethanol as needles that melted at 239–240°.

*Analysis.*—Calcd. for $C_{17}H_{19}NOS$ (percent): C, 72.56; H, 5.37; N, 4.94; S, 11.39. Found (percent): C, 72.86; H, 5.64; N, 5.23; S, 11.52.

EXAMPLE 6

Preparation of 2-($\beta$-diethylaminoethylamino)-3,4-cyclohexenothiaxanthone

A mixture of 2-amino-3,4-cyclohexenothiaxanthone (1 g.) and $\beta$-chlorodiethylaminoethyl (0.5 ml.) was heated under reflux at 180° for 7 hr. The mixture was boiled with few ml. of (50%) NaOH solution, water was added. After decantation of the aqueous layer, the residue was collected and recrystallized from dilute ethanol to give 1.3 gm. (94% yield) of VII. M.P. 114–115°.

*Analysis.*—Calcd. for $C_{23}H_{28}N_2OS$ (percent): S, 72.59; H, 7.41; N, 7.36; S, 8.43. Found (percent): C, 72.53; H, 7.25; N, 7.28; S, 8.55.

The hydrochloride was similarly prepared as described in Example 2, it was yellow product. M.P. 169–170°.

BIOLOGICAL SCREENING

(A) Schistosomiasis

Mice infected with *Schistosoma mansoni*, and already showing viable eggs in their stools, were given orally doses of 60 mg./kg., body weight of the hydrochloride of the compound III dissolved in water, for 12 consecutive days.

Examination for the effect showed that the hydrochloride of the compound III was active, as it caused complete cure from the infection.

(B) Tumor experiments

Mice, biologically inoculated with tumor cells of Ehrlich ascites carcinoma, were given interaperitoneally for 5 consecutive days 80 mg./kg. body weight of the compounds III and 2-($\beta$-diethylaminoethylamino)-3,4-cyclohexenothiaxanthone (X) hydrochloride in water solution at different stages after the date of inoculation. Cell count and weight observations showed that the former III exerted a powerful inhibitory effect on the growth tumors, at different stages after inoculation even in late stages.

The isomer X showed at the same level activity as exerted by the former.

What is claimed is:
1. A compound of the general formula

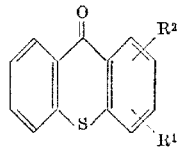

wherein R¹ is the group

and R² is a cyclohexyl residue fused to the thiaxanthone molecule in the 1,2 or 3,4 position, or a pharmaceutically acceptable salt thereof.

2. The compound

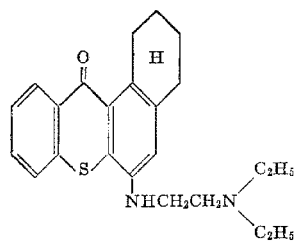

and pharmaceutically acceptable salts thereof.

3. The compound

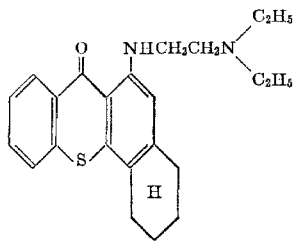

and pharmaceutically acceptable salts thereof.

References Cited
FOREIGN PATENTS
690,465   4/1953   Great Britain _____ 260—328

HENRY R. JILES, Primary Examiner
C. M. S. JAISLE, Assistant Examiner

U.S. Cl. X.R.
424—275

PO-1050
(5/69)

UNITED STATES PATENT OFFICE
CERTIFICATE OF CORRECTION

Patent No. 3,767,674      Dated October 23, 1973

Inventor(s) IBRAHIM MOHAMED NABIB

It is certified that error appears in the above-identified patent and that said Letters Patent are hereby corrected as shown below:

Page 1, line 4 of the patent, "Ostra" should be

--Astra--.

Signed and sealed this 23rd day of April 1974.

(SEAL)
Attest:

EDWARD M.FLETCHER,JR.      C. MARSHALL DANN
Attesting Officer      Commissioner of Patents